United States Patent [19]
Batten et al.

[11] Patent Number: 6,018,161
[45] Date of Patent: Jan. 25, 2000

[54] ADJUSTABLE ADAPTER FOR SCANNING TRANSPARENCIES WITH A REFLECTIVE DOCUMENT SCANNER

[75] Inventors: Patrick A. Batten, Fort Collins; Michael L. Christensen, Windsor; Martha A. Chavez, Greeley, all of Colo.

[73] Assignee: Hewlett-Packard Company, Palo Alto, Calif.

[21] Appl. No.: 09/127,454

[22] Filed: Jul. 31, 1998

[51] Int. Cl.[7] .......................................................... H01J 3/14
[52] U.S. Cl. ........................... 250/234; 250/239; 358/506
[58] Field of Search ..................................... 250/234, 235, 250/239, 216, 208.1; 358/474, 475, 506

[56] References Cited

U.S. PATENT DOCUMENTS 5,140,443  8/1992  Iwahara et al. ........................... 358/474
5,463,217  10/1995  Sobol et al. ............................. 250/234

*Primary Examiner*—Que T. Le
*Attorney, Agent, or Firm*—Augustus W. Winfield

[57] ABSTRACT

An adapter for scanning transparent images using a reflective scanner. The adapter receives light from a lamp inside the scanner and redirects the light through the transparent image and back into the scanner. The scanner has an offset between an illumination line and a scan line. An angle of the adapter relative to the surface of a platen on the scanner is dependent on the distance between the illumination line and the scan line. At least one angle adjuster is provided on the adapter to enable the adapter to be used on scanners having different offsets. In addition, the adapter is made wider than the transparent image to be scanned, so that when the scan line is at a leading or trailing edge of the transparent image, the adapter still captures light from the lamp within the scanner.

3 Claims, 9 Drawing Sheets

ADJUSTABLE ADAPTER FOR SCANNING TRANSPARENCIES WITH A REFLECTIVE DOCUMENT SCANNER

FIELD OF INVENTION

This invention relates generally to optical scanners and more specifically to an adapter for scanning transparent images such as slides and negatives.

BACKGROUND OF THE INVENTION

Document scanners convert a visible image on a document or photograph, or a image in a transparent medium, into an electronic form suitable for copying, storing or processing by a computer. A document scanner may be a separate device or a document scanner may be a part of a copier, part of a facsimile machine, or part of a multipurpose device. Reflective document scanners typically have a controlled source of light which is reflected off the surface of a document, through an optics system, and onto an array of photosensitive devices. The photosensitive devices convert received light intensity into an electronic signal. Transparency scanners pass light through a transparent image, for example a photographic positive slide, through an optics system, and then onto an array of photosensitive devices.

Reflective document scanners may be adapted to scan transparent images by providing a separate light source to back-light the image. U.S. Pat. No. 5,463,217 (Sobol et al.), which is incorporated herein for all that it teaches and describes, describes a completely passive adapter for scanning transparent images in a reflective scanner without requiring a separate light source for back lighting. A light source in the reflective scanner provides light which passes outside the area of the transparent image. The adapter captures light which passes outside the area of the transparent image and reflects the light through the transparent image. The reflected light re-enters the scanner along the optical path required by scanner internal optics. The various embodiments described in Sobol et al. are suitable for a fixed scanner optical path. However, when a new scanner is developed, the angle of the adapter mirrors may need to change to accommodate a different optical path within the new scanner. There is a need for an adjustable adapter that can be adjusted to different optical paths in different scanners, thereby permitting a single adapter to be used with multiple scanner designs. In addition, for some scanners, the lamp leads the scan line during scanning movement, and for other scanners, the lamp lags the scan line during scanning movement. There is a need to ensure that for either case, when the scan line is within the image to be captured, then the lamp is within the light capture area for the adapter.

SUMMARY OF THE INVENTION

One scanner/adapter variable of concern is the distance, measured on the top surface of the platen, from the scan line to the effective illumination line. When this distance changes, the angle of the slide adapter relative to the platen must also change. In a first aspect of the invention, the angle of the overall adapter relative to the platen can be adjusted, thereby providing compensation for scan line to illumination line distance. The second variable of concern is whether the scanner lamp leads or lags the scan line. In a second aspect of the invention, the light capture area extends beyond the image area, thereby enabling the adapter to accommodate designs in which the lamp leads the scan line or designs in which the lamp lags the scan line. Providing adjustable angle and larger light capture area enables the adapter to be used with multiple scanner designs.

DETAILED DESCRIPTION OF THE PREFERRED EMBODIMENT OF THE INVENTION

Figure 1:
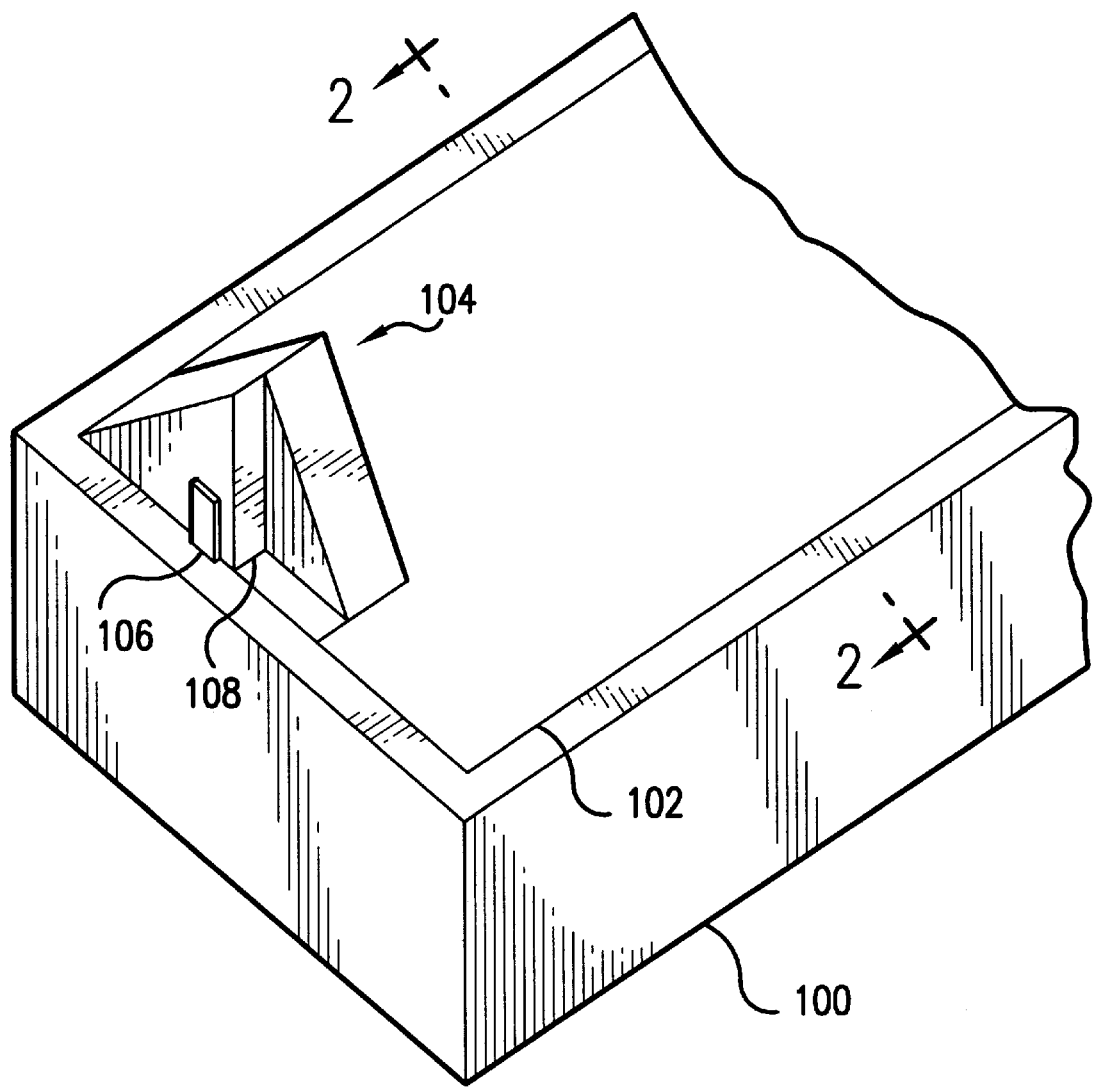
FIG. 1 is a perspective top rear view of a scanner with an adapter for scanning transparencies in accordance with the invention.

FIG. 1 is a perspective view of a scanner 100. The scanner 100 has a transparent platen 102, on which opaque documents or photographs may be placed face down for scanning. An adapter 104 is placed onto or near the surface of the platen. An image transparency, for example a 35 mm positive slide or a strip of film with negative images, is placed on the platen under the adapter 104, as will be discussed below and illustrated in other figures. Of particular interest to the present patent document is an angle adjuster 106, and an offset 108 such that part of the adapter 104 may be substantially wider than the transparent image to be scanned.

Figure 2:
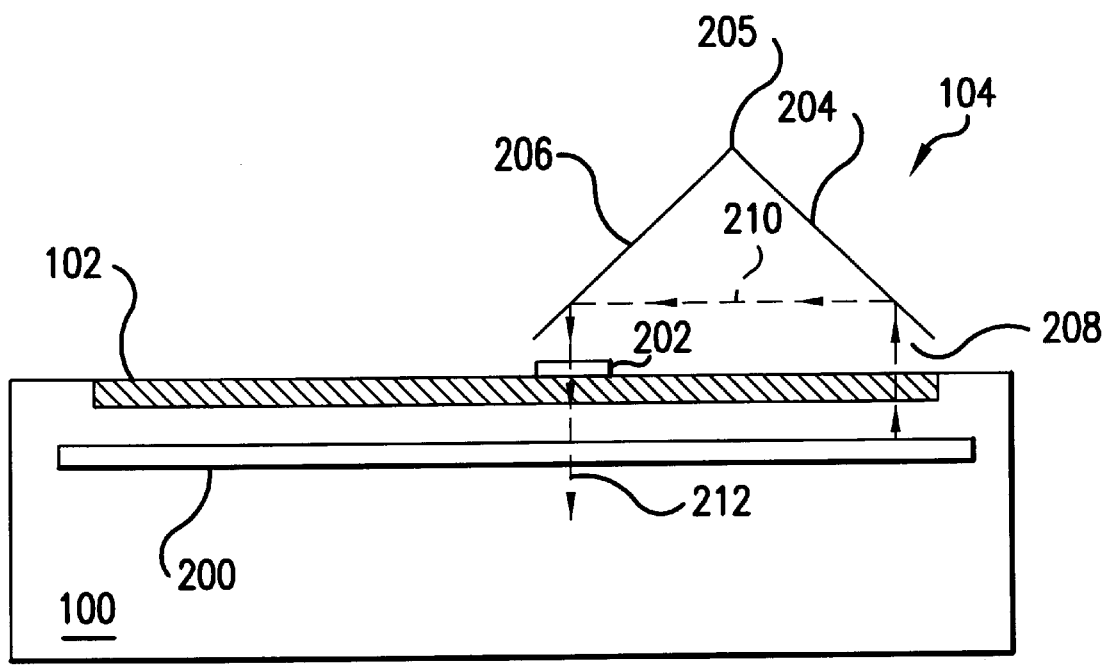
FIG. 2 is a simplified cross section end view of the scanner and adapter of FIG. 1.

FIG. 2 is a simplified cross-section end view of the document scanner 100 and transparency adapter 104 of FIG. 1. In FIG. 2, the document scanner 100 includes an internal lamp 200. Also illustrated is a image transparency 202. The transparency adapter 104 comprises two reflective surfaces (204, 206) that receive light from the lamp 200 within the scanner and re-direct the light through the transparency 202 and back into the scanner at a particular required angle. Dashed lines 208, 210, and 212 depict segments of a ray of light starting within the scanner from the lamp 200, reflecting off surface 204, then off surface 206, passing through the transparency 202 and then re-entering the scanner 100.

Figure 3:
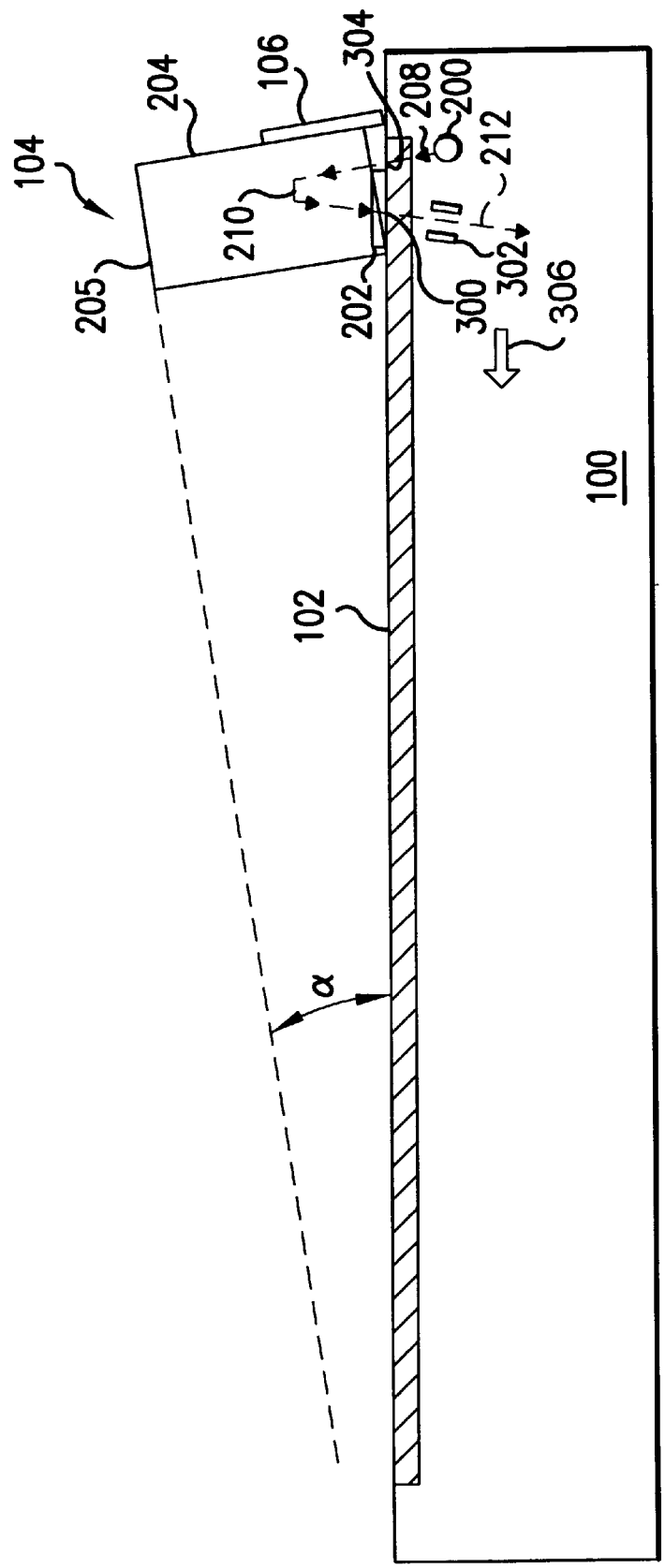
FIG. 3 is a simplified cross section side view of an embodiment of a scanner as in FIG. 1 and the adapter of FIG. 1.

FIG. 3 is a simplified cross-section side view of the document scanner and transparency adapter of FIG. 1. A scan line 300 on the top surface of the platen 102 is defined by optics (not illustrated) within the scanner. In FIG. 3, the required optical path with the scanner is depicted as being controlled by a field stop 302 (not illustrated in FIGS. 1 and 2) which requires light to enter the scanner optics at a particular angle and position. A field stop may or may not be physically present, but in general, every scanner has some effective scan line on the image to be scanned and some effective angle for the light from the scan line entering the scanner optics. In the case of a reflective scanner with an opaque document positioned face down on the top surface of the platen, the scan line is defined on the top surface of the platen. A scanner may also include internal mirrors (not illustrated) for folding an optical path and a lens system (not illustrated). Tracing backwards along light rays 212, 210, and 208, reflective surface 204 effectively receives light along an illumination line 304, which is also defined on the top surface of the platen. Note that for reflective images, the scan line and the illumination line may be identical. That is, due to specular reflection, some light at the scan line is directly reflected at the proper angle to be received by the scanner optics. However, for the transparency adapter, an effective illumination line 304 is offset from the scan line. The intersection (205) of the reflective planes (FIG. 2, 204, 206) is at an angle γ relative to the plane of the platen 102. The magnitude of the angle γ is determined by the offset between the scan line 300 and the effective illumination line 304. In FIG. 3, the angle γ, and the offset between the scan line and the illumination line, are exaggerated to facilitate illustration. As will be discussed further below, angle γ is adjustable by use of angle adjuster 106.

Figure 4A:
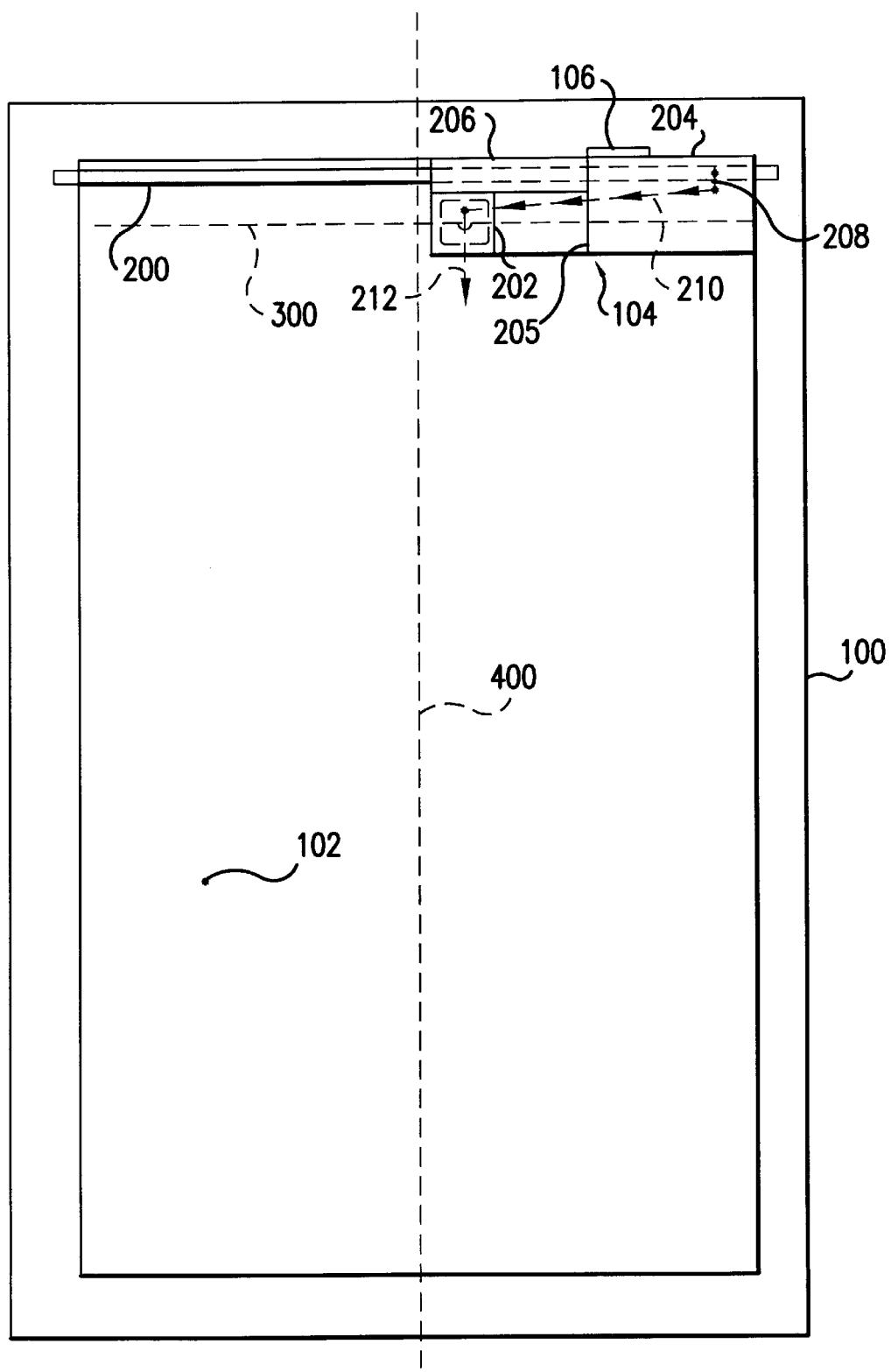
FIG. 4A is a simplified top view of the scanner embodiment of FIG. 3 and the adapter of FIG. 1.

FIG. 4A is a simplified top view of the document scanner of FIG. 3 and the transparency adapter of FIG. 1. Note in FIG. 4A that as a result of the angle γ (figure 3), light ray segment 210 has a directional component parallel to the centerline 400 of the scanner. The directional component of segment 210 parallel to the centerline 400 provides an illumination offset required by the effective offset between the lamp 200 and the scan line 300.

Note also in FIGS. 2 and 4A that the image transparency 202 is placed near the centerline 400 of the platen 104. As discussed in Sobol et al. (FIG. 9), light rays from the scan line may also be required to converge toward the center line of the scanner to a small sensor array. As discussed in Sobol et al., if the image transparency extends too far toward the ends of the lamp, and if the scanner optics have a short focal length, a lens may be required within the adapter. Placing the image transparency near the centerline of the platen, instead of near a side edge of the platen, eliminates the need for a lens in the adapter for many scanners.

Figure 4B:
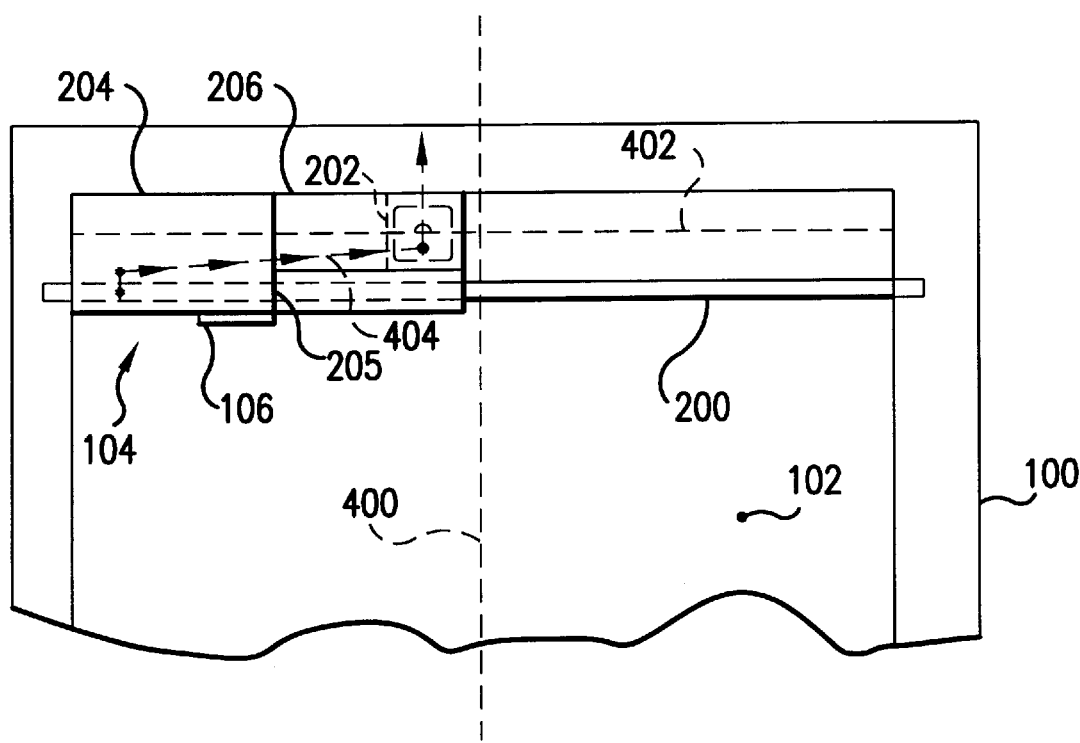
FIG. 4B is a simplified top view of an alternative embodiment of a scanner as in FIG. 1 and the adapter of FIG. 1

In FIGS. 3 and 4A, note that the lamp 200 and scan line 300 move past the image transparency 202 along direction 306 (FIG. 3), scanning one line at a time. In FIG. 3, for lamp and scan line movement in direction 306, the scan line leads the lamp. In some scanners, the scan line may trail the lamp. In FIG. 4B, the scan line 402 trails the lamp 200. If the spacing between the illumination line for lamp 200 and scan line 402 (FIG. 4B) is the same as the spacing between the illumination line for lamp 200 and scan line 300 (FIG. 4A), the angle γ (FIG. 3) remains the same, and the adapter 104 is simply rotated 180 degrees and placed onto the opposite side of the platen (FIG. 4B) to provide an offset in light segment 404 (FIG. 4B) parallel to the centerline 400.

In FIGS. 3 and 4A, if the adapter 104 is made approximately the same width as the image transparency 202, when the scan line first reaches the leading edge of the image the lamp may still be outside the adapter. In FIG. 4B, if the adapter 104 is made approximately the same width as the image transparency 202, when the scan line is at the trailing edge of the image (as defined by scanning direction 306 in FIG. 3), the lamp 200 may have passed beyond the adapter. In the example embodiment of the adapter illustrated in FIGS. 1, 2, 3, 4A and 4B, the reflecting surface that first receives light from the lamp (reflecting surface 204) is made wider than the reflecting surface that directs light through the image transparency (reflecting surface 206). The location of the image transparency is then offset so that in the case of the scan line leading the lamp (FIGS. 3 and 4A), the image is placed so that when the scan line first reaches the leading edge of the image the lamp is under the adapter. For the case of the scan line trailing the lamp (FIG. 4B), the adapter is simply rotated 180 degrees and placed onto the opposite side of the platen, resulting in an image placement so that when the scan line reaches the trailing edge of the image, the lamp is still under the scanner. Alternatively, the entire adapter may be made as wide as the reflecting surface 204, with suitable locating features for the image transparency.

Figure 5A:
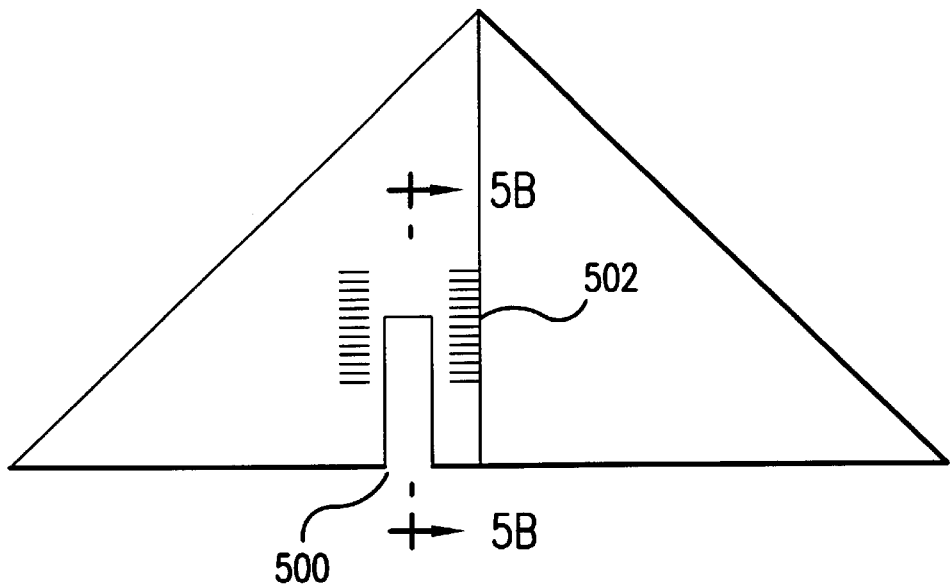
FIG. 5A is a rear plane view of the adapter of FIG. 1 with the angle adjuster removed.
Figure 5B:
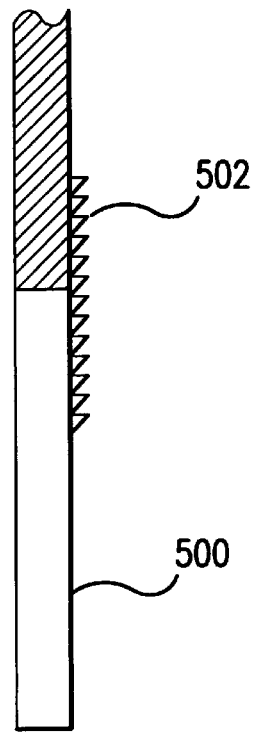
FIG. 5B is a cross section view through the rear wall of the adapter of FIG. 5A.

The specific details regarding how angle adjustment is accomplished are not important and the following examples are just to illustrate two possible example embodiments. FIG. 5A shows the rear (when positioned as in FIGS. 1, 3 and 4A) face of the adapter 104 with the angle adjuster 106 removed. In the example embodiments for adjustable angle, the rear wall of the adapter includes a notch 500 with a ratchet pattern 502 formed on the rear face, on both sides of the notch. FIG. 5B provides additional detail for the ratchet pattern 502.

Figure 6A:
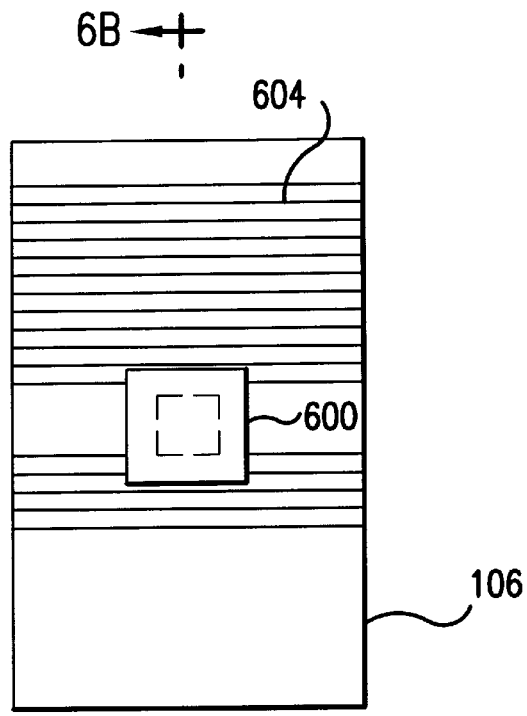
FIG. 6A is a front view of one embodiment of the angle adjuster of FIG. 1.
Figure 6B:
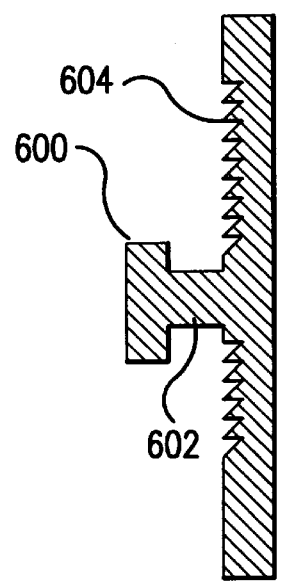
FIG. 6B is a cross section view through the angle adjuster of FIG. 6A.

FIG. 6B shows the face of the angle adjuster 106 that presses against the surface of the adapter shown in FIG. 5A. In the example embodiment illustrated in FIGS. 6A and 6B, the angle adjuster 106 has a flange 600 on a post 602 so that the post 602 may be inserted into the slot 500 (FIG. 5A), and the flange 600 holds the angle adjuster securely against the adapter. Ratchet patterns 604 on the angle adjuster 106 mate with the ratchet patterns 502 on the adapter (FIG. 5A) so that the adjuster 106 may be easily moved upward (post 602 may easily move further into the slot 500) but the ratchet patterns will not allow the adapter to slip down unless the ratchet patterns are forced apart.

Figure 7A:
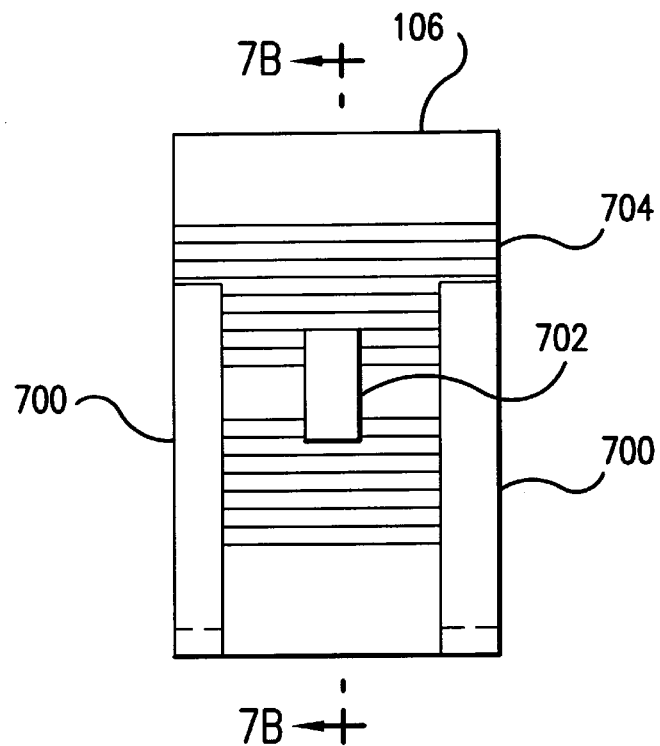
FIG. 7A is a front view of a second embodiment of the angle adjuster of FIG. 1.
Figure 7B:
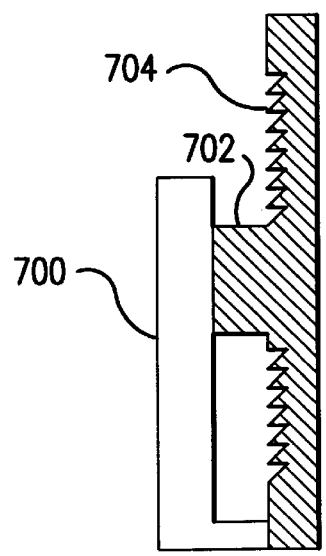
FIG. 7B is a cross section view through the angle adjuster of FIG. 7B.

In the example embodiment illustrated in FIGS. 7A and 7B, the angle adjuster has a post 702 without a flange, and the adjuster has fingers 700 that slip behind the rear wall of the adapter for holding the angle adjuster to the adapter. Ratchet patterns 704 mate with ratchet patterns 502 on the adapter, thereby permitting easy attachment of the adjuster to the adapter but requiring the ratchet patterns to be forced apart to enable removal of the adjuster.

Figure 8:
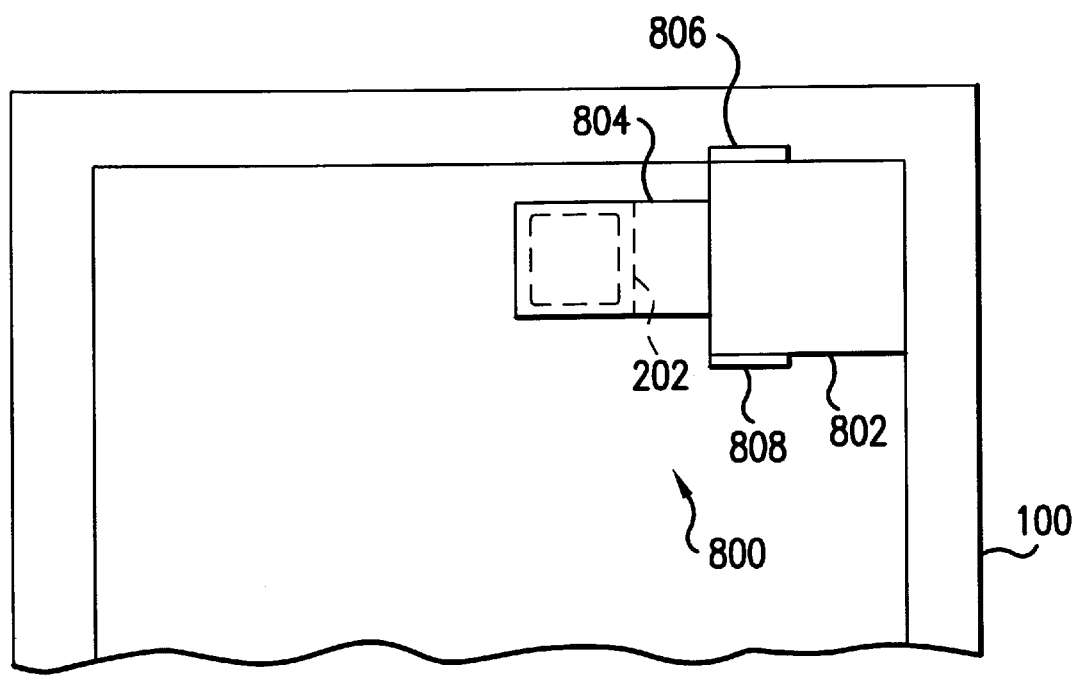
FIG. 8 is a top view of an alternative embodiment of an adapter in accordance with the invention.

In FIGS. 4A and 4B, the adapter is rotated 180 degrees and placed onto the opposite side of the platen. For ease of use, it may be preferable to always locate one particular corner of the adapter at one particular corner of the platen. If a standard reference corner is desirable, then the adapter may be made slightly larger and symmetrical. An example is illustrated in FIG. 8. In FIG. 8, an adapter 800 has a first reflective surface 802 receiving light, and a second reflective surface 804 that directs light through a transparent image 202. Reflective surface 802 extends beyond reflective surface 804 in both leading and trailing scanning directions to accommodate a lamp leading the scan line or a lamp trailing the scan line. In addition, the adapter 800 has two angle adjusters 806 and 808 so that either the leading edge or the trailing edge can be lifted. The resulting adapter can accommodate a lamp leading the scan line, a lamp trailing the scan line, adjustable angle γ (FIG. 3), and is always placed with one particular adapter corner positioned at one particular platen corner.

As discussed above, adapters 104 and 800 in the present patent document have three important improvements over the adapters in Sobol et al., as follows:

1. The angle γ is adjustable by use of angle adjuster (106, 806, 808).

2. The light receiving reflecting surface (204, 802), is made wider than the image transparency to accommodate varying positions of the lamp relative to the scan line.

3. The position of the image transparency within the adapter is offset from one or both edges of the light receiving reflecting surface, along the dimension parallel to the centerline of the scanner.

As a result of the above three improvements, adapter 104 can be used with a variety of different scanners, with different illumination line to scan line spacings, and different spatial ordering of the lamp relative to the scan line.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An adapter for scanning a transparent image using a reflective scanner, the reflective scanner having a platen for receiving a reflective document, the adapter comprising:

at least two planar surfaces, the planar surfaces at least partially reflective so that when the adapter is placed onto the platen, light from inside the reflective scanner passes outside the transparent image and is reflected off the planar surfaces and through the transparent image back into the reflective scanner;

the surfaces intersecting at a line of intersection, such that when the adapter is placed onto the platen, the line of intersection has an angle relative to the platen; and at least one angle adjuster, the angle adjuster moveable relative to the planar surfaces so that when the adapter is placed onto the platen, movement of the angle adjuster relative to the planar surfaces changes the angle of the line of intersection relative to the platen.

2. The adapter of claim 1, the scanner effectively having a scan line on the platen, the adapter further comprising:

the planar surfaces comprising a first surface that directly receives light from the scanner along an illumination line, such that when the scan line is on the transparent image and the illumination line is outside the transparent image, the first surface receives light along the illumination line from the scanner.

3. The adapter of claim 2, the scan line moving in a scanning direction when the scanner is scanning an image, the adapter further comprising:

the first surface having a dimension, in the scanning direction, that is substantially greater than a dimension of the transparent image in the scanning direction.

* * * * *